(12) United States Patent
Mehl et al.

(10) Patent No.: US 7,706,069 B2
(45) Date of Patent: Apr. 27, 2010

(54) ATTENUATOR FOR HIGH-POWER UNPOLARIZED LASER BEAMS

(75) Inventors: Oliver Mehl, Burlingame, CA (US); R. Russel Austin, Cool, CA (US)

(73) Assignee: Coherent, Inc., Santa Clara, CA (US)

(*) Notice: Subject to any disclaimer, the term of this patent is extended or adjusted under 35 U.S.C. 154(b) by 212 days.

(21) Appl. No.: 11/803,271

(22) Filed: May 14, 2007

(65) Prior Publication Data

US 2008/0285130 A1    Nov. 20, 2008

(51) Int. Cl.
    *G02B 27/28* (2006.01)
(52) U.S. Cl. .............. 359/485; 372/27; 372/29.014; 372/29.02
(58) Field of Classification Search .......... 359/501, 359/485
    See application file for complete search history.

(56) References Cited

U.S. PATENT DOCUMENTS

| | | | |
|---|---|---|---|
| 4,773,732 A * | 9/1988 | Schafer | 359/578 |
| 5,311,217 A * | 5/1994 | Guerin et al. | 347/246 |
| 5,740,288 A | 4/1998 | Pan | 385/11 |
| 5,877,876 A | 3/1999 | Birdwell | 349/39 |
| 6,059,555 A | 5/2000 | Barenboim et al. | 425/135 |
| 6,330,097 B1 | 12/2001 | Chen et al. | 359/239 |
| 6,850,544 B2 | 2/2005 | Friesem et al. | 372/19 |
| 2003/0149425 A1* | 8/2003 | Takada et al. | 606/4 |
| 2004/0201880 A1 | 10/2004 | Lee | 359/326 |
| 2005/0143720 A1 | 6/2005 | Yamada et al. | 606/10 |
| 2007/0047081 A1 | 3/2007 | Hodgson et al. | 359/499 |

FOREIGN PATENT DOCUMENTS

JP    2-234114    9/1990

* cited by examiner

*Primary Examiner*—Lee Fineman
(74) *Attorney, Agent, or Firm*—Morrison & Foerster LLP

(57) ABSTRACT

Apparatus for attenuating an unpolarized laser beam includes a polarizing beamsplitter for separating the laser beam into two plane-polarized beams following separate paths. The two plane-polarized beams are polarization rotated by a single polarization rotator. Each of the polarization-rotated beams is separated by a polarizing beam-combiner into two plane-polarized portions. One of the portions of one polarization-rotated beam is combined by the beam-combiner with one of the portions of the other polarization-rotated beam to provide an attenuated output-beam. In certain examples of the apparatus the separate paths are made equal in length so that combined beam portions are equal in diameter.

11 Claims, 4 Drawing Sheets

ATTENUATOR FOR HIGH-POWER UNPOLARIZED LASER BEAMS

TECHNICAL FIELD OF THE INVENTION

The present invention relates in general to laser beam attenuators. The invention relates in particular to laser beam attenuators including polarizing and polarization rotating elements.

DISCUSSION OF BACKGROUND ART

In many applications of high-power lasers, particularly applications of Q-switched, high-power, pulsed lasers, it is often desirable to be able to provide variable attenuation of the laser output. Commonly-used high-power Q-switched solid state lasers often provide an output beam that is unpolarized. If laser pump power delivered to the laser is changed, for example, to change output power at a selected level, this can cause a substantial change in thermal lensing of the solid-state gain-medium and a consequent change in the quality of the output beam and the beam pointing. Both of these parameters are critical in applications that are beam-position sensitive, for example, in applications where the beam must be focused into an optical fiber. For the applications that need variable pulse energy in an output beam, there is a need to have an apparatus that that is insensitive to the degree of polarization of laser output and can provide variable pulse energy without varying the pump power to the laser thereby maintaining optimum beam quality and pointing.

SUMMARY OF THE INVENTION

The present invention is directed to a method and apparatus for providing a laser beam of variable power. The method relies on providing a variable attenuator for selectively attenuating an output beam of a laser, rather than varying operating parameters of the laser to provide selectively variable output power. More particularly, the subject invention functions to reduce the power of a laser beam from an initial level to a lower target level and wherein the power will remain at that target level even if the initial polarization state of the input laser beam varies.

In one aspect, apparatus in accordance with the present invention comprises first and second polarizing beamsplitters and at least two reflectors. Each of the polarizing-beamsplitters is arranged to transmit radiation plane-polarized in a first orientation and reflect radiation plane-polarized in a second orientation. The first and second polarizing beamsplitters and the at least two reflectors are arranged such that the first polarizing beamsplitter receives the beam to be attenuated and divides the beam into a first component transmitted along a first path to the second beamsplitter and a second component reflected along a second path to the second beamsplitter. The first and second beamsplitters and the at least two reflectors are further arranged such that any portion of the first beam-component transmitted by the second polarizing beamsplitter propagates along a common path with any portion of the second beam-component reflected by the second polarizing beamsplitter. A single polarization rotator is located in the first and second beam paths and is arranged to selectively vary the polarization orientation of the first and second beam components at the second beamsplitter.

Rotating the polarization planes of the first and second plane polarized beams with a single polarization rotator provides that these beams are polarization-rotated through about the same angle. This provides that the attenuation of the beam is independent of the polarization state of the laser input beam. Preferably the paths of the beam components between the polarizing beamsplitters are arranged to be equal. This provides that the beam portions propagating along the common path are about equal in diameter when recombined.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
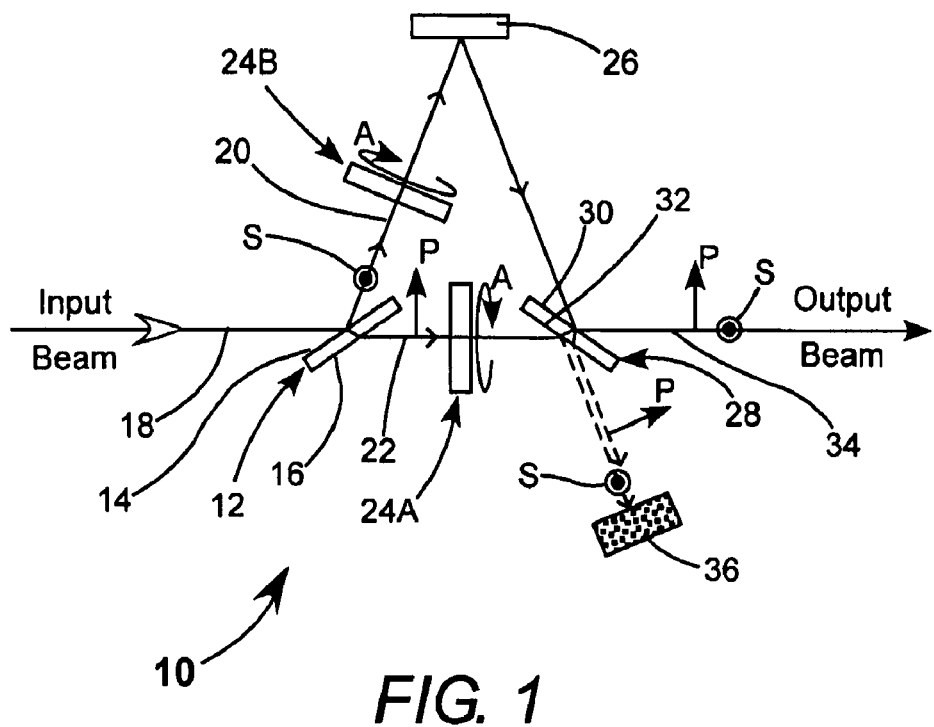
FIG. 1 schematically illustrates one preferred embodiment of an attenuator in accordance with the present invention including a Brewster-angle oriented, front-surface thin-film polarizing beamsplitter, a Brewster-angle oriented, front-surface thin-film polarizing beam-combiner, and two rotatable half-wave plates.

Referring now to the drawings, wherein like components are designated by like reference numerals, FIG. 1 schematically illustrates a preferred embodiment 10 of a laser beam attenuator in accordance with the present invention. Attenuator 10 includes a polarizing beamsplitter 12 having a thin film polarizer coating (not shown) on a surface 14 thereof. Beamsplitter 12 is preferably inclined at the Brewster angle to a path 18 along which an input laser beam to be attenuated is directed into the attenuator. The polarizing beamsplitter coating divides the input beam into two plane-polarized components. One of the components is plane-polarized perpendicular to the plane of incidence of the beam on the beamsplitter (here perpendicular to the plane of the drawing) and is reflected from the polarizing beamsplitter coating along a path 20. This component is usually referred to by practitioners of the art as being S-polarized and is indicated in FIG. 1 by an end-on arrowhead S. The other component is plane-polarized parallel to the plane of incidence of the beam on the beamsplitter (here parallel to the plane of the drawing) and is transmitted through the polarizing beamsplitter coating along a path 22. This component is usually referred to by practitioners of the art as being P-polarized and is indicated in FIG. 1 by an arrow P. Having the polarizing beamsplitter arranged at the Brewster angle optimizes the polarization properties of the beamsplitter coating and provides near-zero transmission loss (negligible reflection loss) at rear surface 16 of the beamsplitter. If the beamsplitter is arranged at some angle other than the Brewster angle it may be found advisable to provide an antireflection coating on surface 16.

Located in each of beam paths 20 and 22 is a half-wave plate (polarization rotator) 24A and 24B. A half-wave plate rotates the plane of polarization of a beam, dependent on the angle of the input polarization plane to the optic axis (fast or slow) of the half-wave plate. When the optic axis is aligned with the polarization plane of the input beam there is no rotation of the polarization plane. When the optic axis is aligned at ±45° (±π/4 Radians) to the beam the polarization plane is rotated by ±90°. Plates 24A and 24B can be synchronously rotated about the respective beam paths as indicated by arrows A.

Path 22 extends through the half-wave plate therein to another polarizing beamsplitter 28 which also serves as a beam-combiner. Polarizing beamsplitter (combiner) 28 is configured similarly to polarizing beamsplitter 12, but oriented at Brewsters angle to the path in an opposite sense. Here it is assumed that the polarizing coating is on surface 30 of the beamsplitter. If the axis of the half-wave plate is aligned with the polarization plane, light exiting the half-wave plate will still be P-polarized with respect to beamsplitter 28 and will be maximally transmitted by the beamsplitter along a path 34. If there is an alignment of optic axis of the half wave-plate with the polarization plane that is not zero or one-hundred-eighty degrees, light exiting the half-wave plate will be rotated out of the P-orientation, and will be resolved by polarizing beamsplitter 28 into a P-polarized component that is transmitted through the beamsplitter along path 34 and an S-polarized component that is reflected from the beamsplitter to a beam dump 36 as indicated in FIG. 1 by a dashed line. It should be noted, for completeness of explanation, that a part of the S-polarized component will be reflected from surface 32 of the beamsplitter into the beam dump.

Path 20 is "folded" by a mirror 26 an directed back onto surface 30 of polarizing beamsplitter 28 at a position such that any radiation reflected by the beamsplitter out of path 20 as S-polarized radiation is directed along path 34 and combines with any radiation from path 24 transmitted by the beamsplitter as P-polarized radiation. In this regard, the polarizing beamsplitter is functioning as a beam-combiner. Any radiation from path 22 transmitted by beamsplitter 28 is P-polarized and makes an essentially loss-free pass through surface 32 to beam dump 36 as indicated by a dashed line in FIG. 1.

Each half-wave plate is preferably initially calibrated to determine the 100% transmission orientation for the polarization state that will be incident on the half-wave-plate. When both plates are in this orientation there will be maximum throughput into the output beam of the attenuator. For radiation at most wavelengths greater than about 400 nanometers (nm), maximum throughput will usually be close to 100%, with perhaps about 3% being lost due to scatter and absorption losses or manufacturing tolerances on the reflection and transmission of the beamsplitter coatings.

In order to attenuate radiation, both half-wave plates are preferably rotated synchronously, i.e., through the same angle, from the calibrated 100% throughput orientation, to a new orientation. Here it should be noted that the term "synchronously" as used in this description and the appended claims does not mean that the plates must be rotated simultaneously (although this is an option), but merely that rotating one will require rotation of the other. In this new orientation, the polarization plane of light transmitted by the half-wave plates is rotated, unwanted light is directed out of the attenuator to the beam dump, and the remaining light is recombined as output along path 34 by the optical processes discussed above. Variable power can thus be provided by optimizing the beam quality of a laser, operating the laser stably at a constant output power, and using the attenuator to reduce that power as described above, as required. If there are any changes in the state of polarization of the input beam, the attenuation provided by the attenuator will stay the same, whatever magnitude are the P and S polarized components resolved by polarizing beamsplitter 12, as those components are equally attenuated. By way of example, if an input beam having an initial power W is resolved into P and S-polarized components having power a*W and b*W respectively (where a+b=1), and each is attenuated by a factor x, then the P and S-polarized components in the output beam of path 34 will have power x*a*W and x*b*W, respectively, providing a total power of x*(a+b)*W, i.e., x*W, whatever the value of a and b.

Figure 2:
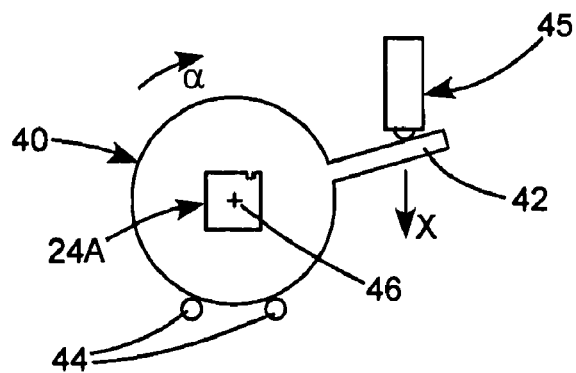
FIG. 2 schematically illustrates one example of an arrangement for rotating a half-wave plate in the attenuator of FIG. 1.

FIG. 2 schematically illustrates an example of one mechanism by which the polarizers can be rotated by a computer operable actuator. Here the half-wave plate 24A is a square plate and is held centrally in a circular holder 40 having a radial arm 42 extending therefrom. Holder 40 is peripherally supported on roller bearings 44. An actuator 45 moves arm 42 linearly, as indicated by arrow X. This causes the plate to rotate around a rotation axis 46 of the circular portion of the holder. One suitable actuator is a micrometer screw driven by an encoded shaft drive or servo motor.

Axis 46 is aligned with that beam path (20 or 22) in which the half-wave plate is rotated. The rotation angle as a function of translation of the actuator in the X direction will depend on the radial distance of the actuator from axis 46. This rotation mechanism is but one computer operable mechanism for rotating the half-wave plate. Those skilled in the art may devise other computer operable rotation mechanisms without departing from the spirit and scope of the present invention. By way of example a holder for a half-wave may be provided with peripheral gear teeth, supported on a pair of mating idler gear wheels, and rotated by a worm gear meshing with the peripheral gear teeth and driven by a servo motor.

Figure 3:
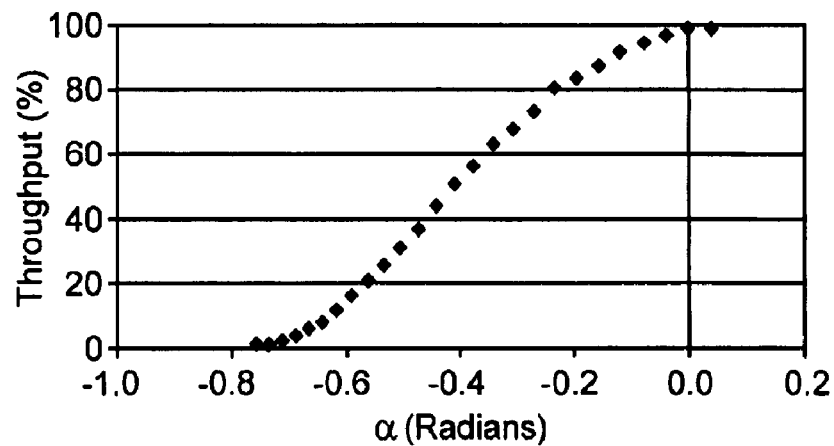
FIG. 3 is a graph schematically illustrating measured percentage throughput as a function of the rotation angle of the half-wave plates in one example of the attenuator of FIG. 1.

FIG. 3 is a graph is a graph schematically illustrating measured percentage throughput as at a number of different rotations (orientations) a in radians of the half-wave plates in one example of the attenuator of FIG. 1. The actual measured maximum transmission value is about 97% and the polarization extinction ratio along either of the beam paths is greater than 100:1. This means that the attenuator is capable of providing controllable attenuation to throughputs down to about 1% or less of the input power. It can be seen from the graph that the maximum transmission value does not coincide with the nominal (α=0.0) orientation suggested by the half-wave-plate manufacturer's indication of the optic-axis orientation. Correspondingly, maximum attenuation does not occur at exactly 45° (0.785 radians). These discrepancies can be caused by one or more factors including, but not limited to, residual or mounting stress birefringence in the polarizing beamsplitter substrates, manufacturing tolerances on the waveplates, and misalignment of the polarizing beamsplitters one with the other. This highlights the importance of calibrating each half-wave plate individually to find the actual 100% throughput orientation before connecting the mechanism for synchronous rotation of the half-wave plates.

Information of the type shown by the graph can be stored in computer memory as look-up table. A computer control sequence for a laser and an attenuator can provide a sensor cooperative with a controller, with the controller being responsive to user input, and having the look-up table electronically stored therein. In response to a user-input requesting a specific output beam power from the attenuator, the controller can calculate the attenuation required (or a new value of attenuation if the beam is already being attenuated), consult the look-up table to determine the value of a required (or the actuator setting which provides that value of α) and activate the actuator to synchronously rotate both half-wave plates to the required α value. Alternatively, output power of the attenuator can be monitored by, and a desired output power established and maintained, by the controller comparing the monitored power with the desired power and rotating the half-wave plates until the desired power is reached, and then periodically fine-adjusting the angle of the half-wave plates, if necessary, to maintain the desired power output.

Figure 4:
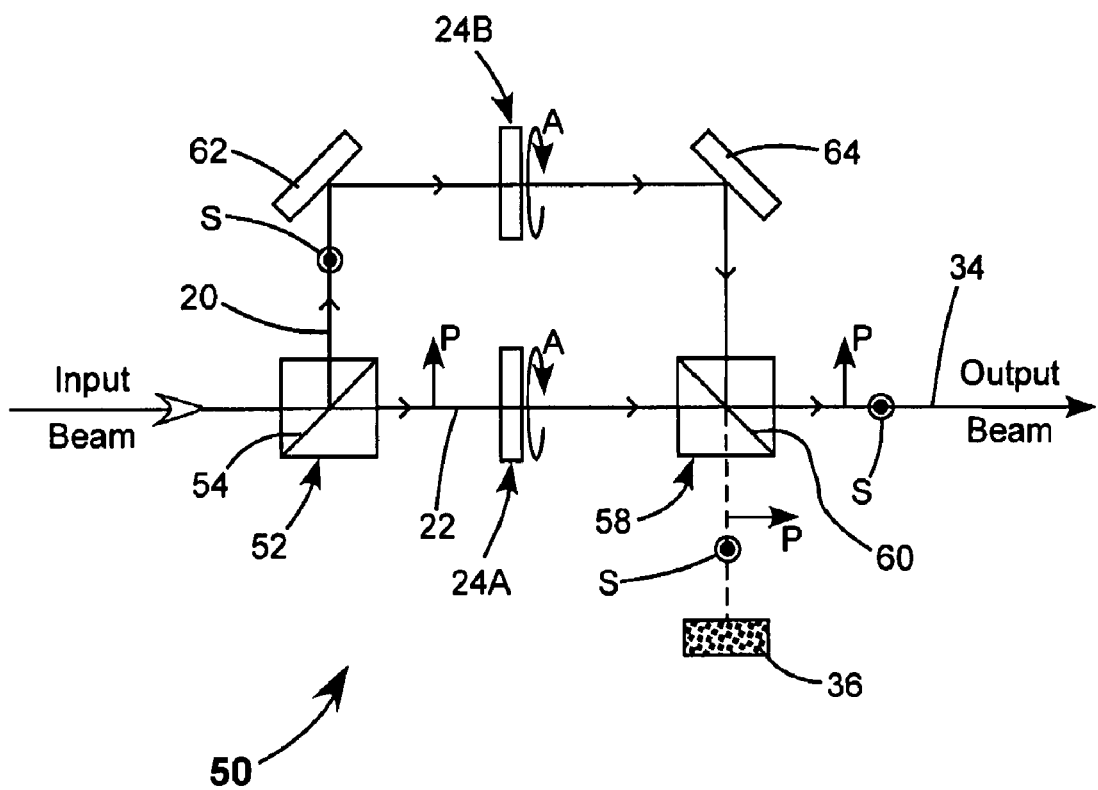
FIG. 4 schematically illustrates another preferred embodiment of an attenuator in accordance with the present invention including a 45-degree biprism polarizing beamsplitter, a 45-degree biprism polarizing beam-combiner, and two rotatable half-wave plates.

FIG. 4 schematically illustrates another preferred embodiment 50 of a laser beam attenuator in accordance with the present invention. Attenuator 50 operates according to the same principle as attenuator 10 of FIG. 1 but employs 45° biprism-type polarizing beamsplitters 52 and 58 in place of front-surface Brewster-oriented polarizing beamsplitters 12 and 28. Polarizing beamsplitters 52 and 58 have internal surfaces 54 and 60 created by optically bonding two prisms together to form the biprism. Each internal surface includes a thin film polarizing coating (not shown). The internal surfaces are oriented at 45° to entrance and exit faces of the biprism and these faces are oriented perpendicular to beam paths. Two turning mirrors 62 and 64 are required for folding path 20 back to polarizing beamsplitter 58 to be recombined with path 22 in common path 34. Beamsplitters 52 and 58 are sometimes referred to as cube-beamsplitters. Those skilled in the art will recognize, however, that a biprism-type polarizing beamspitter can have an internal surface that is at some angle other than 45° to an entrance or exit face, and need not be cubic.

One advantage of a biprism-type polarizing beamsplitter is that polarization can be provided over a broad spectral bandwidth, for example over a three to four hundred nanometers. Front-surface polarizers by comparison are effective only over a few tens of nanometers at best. Accordingly, attenuator 50 could be used with a wide range of lasers changing only the half-wave plates for a particular laser wavelength, while in attenuator 10 beamsplitters 12 and 28 in addition must usually be configured for one particular laser wavelength. Another advantage of attenuator 50 is that the "dumped" beam-portions are combined on a common path. Those skilled in the art will recognize, without further illustration or detailed description, that an alternative embodiment of the present invention is possible, similar to the embodiment of FIG. 4, but wherein the combined "dumped" beam-portions of FIG. 4 become the output beam, and the output beam portions FIG. 4 become the "dumped" beam-portions.

One disadvantage of the biprism beamsplitters is that antireflection coatings would be required to eliminate Fresnel losses at entrance and exit faces. Another disadvantage is that such biprisms often exhibit a stress birefringence (residual or due to bonding the prisms) sufficient that the "crossed" orientation of the prisms may be up to 10° or greater different from a presumed (ideal) 90° orientation of one with respect to another. This can make calibration of an attenuator such as attenuator 50 particularly difficult and may lead to maximum-throughput restrictions.

A disadvantage of both of the above described embodiments of the inventive attenuator is that the two beam paths 20 and 22 through the attenuator have significantly different lengths. This is a disadvantage inasmuch as a beam from a high power laser is usually divergent. Accordingly, the beam portion following the longer of the two paths (path 20 in the embodiments described above) will have a larger cross-section on the polarizing beam-combiner than the beam portion following the shorter of the two paths. This will adversely affect the quality of beam 34 including the combined beam portions.

A further disadvantage of both of the above-described embodiments is that two rotatable half-wave plates are required. This requires two rotating mechanisms, and means for synchronizing the rotating mechanisms. This adds to the cost and complexity of the attenuators.

Figure 5:
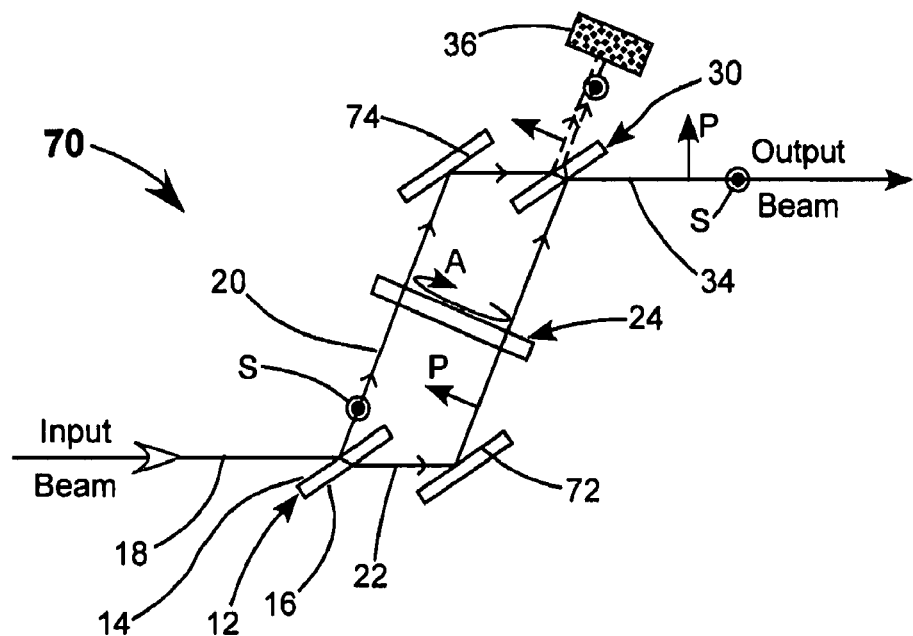
FIG. 5 schematically illustrates yet another preferred embodiment of an attenuator in accordance with the present invention including a Brewster-angle oriented, front-surface thin-film polarizing beamsplitter, a Brewster-angle oriented, front-surface thin-film polarizing beam-combiner, cooperative with two Brewster angle oriented mirrors providing two parallel beam paths through the attenuator with a single rotatable half-wave plate intercepting both of the parallel paths.

FIG. 5 schematically illustrates yet another preferred embodiment 70 of a laser beam attenuator in accordance with the present invention. Attenuator 70 is similar in principle to attenuator 10 of FIG. 1 and corresponding components are designated by like reference numerals. One difference between attenuator 70 and attenuator 10 is that a Brewster-angle-oriented mirror 72 is arranged cooperative with Brewster-angle-oriented polarizing beamsplitter 12 such that path 22 of p-polarized radiation transmitted by the polarizing beamsplitter is reflected from mirror 72 parallel to path 20 of the s-polarized radiation reflected from the beamsplitter. A single rotatable half-wave plate 24 is positioned to intersect both light paths 20 and 22. Another Brewster-angle-oriented mirror 74 reflects path 20 onto Brewster-angle-oriented polarizing beam-combiner 30 which combines paths 20 and paths 22 into common path 34 of the output beam. Preferably the polarizing beamsplitter and combiner are front-surface dielectric multilayer polarizing beamsplitters. However, other polarization sensitive beamsplitter devices such as Glan-Thompson prisms, McNielle biprisms and the like may be used in this and other embodiments of the present invention described hereinbelow without departing from the spirit and scope of the present invention.

Clearly, in the arrangement of attenuator 70, the path lengths of the s-polarized and p-polarized beam paths 20 and 22 respectively are equal, and beams traveling therealong will have the same diameter when recombined along path 34 by polarizing beam-combiner 30. This arrangement, however, is not without disadvantages. One disadvantage is that the single rotatable half-wave plate 24 must be larger than the synchronously rotatable half-wave plates 24A and 24B of attenuators 10 and 50. It should be noted here that a single rotatable half-wave plate 24 could be substituted for half-wave-plates 24A and 24B in attenuator 50 of FIG. 2. There would still, however, be a path difference between paths 20 and 22.

Another disadvantage of the arrangement in FIG. 5 is that it may be difficult to insure that both beams 20 and 22 experience the same level of polarization rotation. More specifically, in the FIG. 5 embodiment, the two beam paths do not intersect with the half-wave plate 24 at the same location on the plate. Due to manufacturing tolerances, crystal imperfections, thermal effects and the like, the level of polarization rotation at the two separate locations where the two beams cross the plate may be different. As noted above, in the preferred embodiment, it is desirable that both beams experience the same level of polarization rotation.

Figure 6:
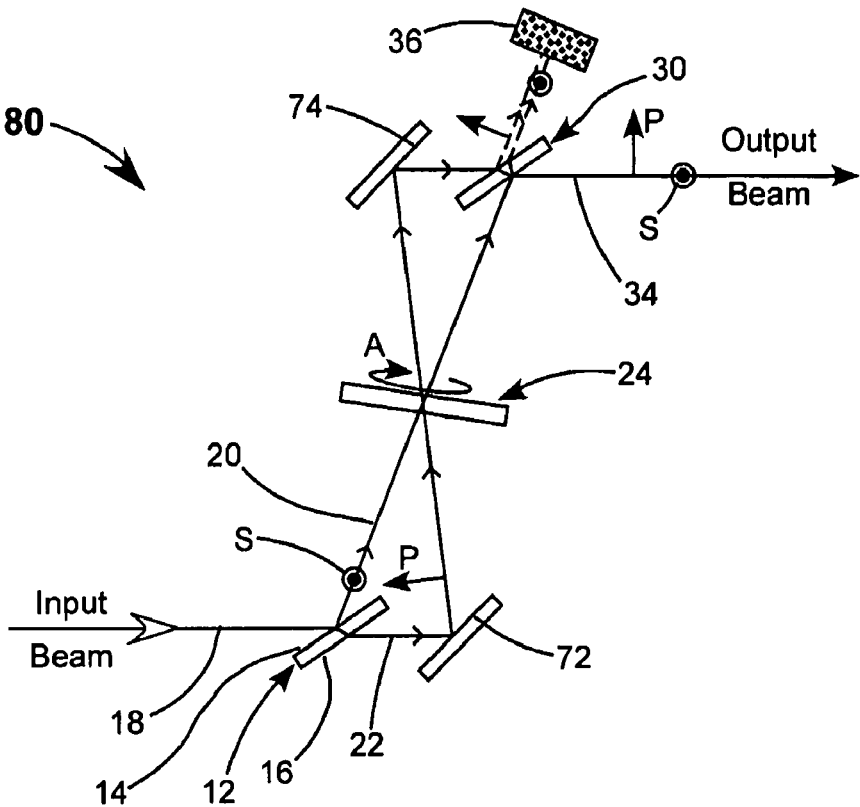
FIG. 6 schematically illustrates still another preferred embodiment of an attenuator in accordance with the present invention including a Brewster-angle oriented, front-surface thin-film polarizing beamsplitter and a Brewster-angle oriented, front-surface thin-film polarizing beam-combiner, cooperative with two mirrors providing two intersecting beam paths through the attenuator with a single rotatable half-wave plate intercepting both of the intersecting paths.

FIG. 6 schematically illustrates still another embodiment 80 of an attenuator in accordance with the present invention configured to address the latter concern. This embodiment includes a polarizing beamsplitter 12, a polarizing beam-combiner 30 and mirrors 72 and 74 similar to attenuator 70 of FIG. 5. In attenuator 80, however, mirror 72 is arranged to direct path 22 transmitted by polarizing beamsplitter 12 onto mirror 74, which then directs path 22 onto polarizing beam-combiner 30. Polarizing beamsplitter 12 reflects path 20 directly to polarizing beam-combiner 30 to be combined with path 22 along common path 34. This arrangement provides that paths 20 and 22 are at angle to each other an intersect in space between mirrors 72 and 74.

Single rotatable half-wave plate 24 is preferably located at the intersection of paths 20 and 22 such that beams traveling along those paths traverse the half-wave plate at the same location. By this arrangement, both beams will necessarily experience the same level of polarization rotation. It should be noted, here, however, that half-wave plate 24 in attenuator 20 should be specified as a half-wave plate at the angle of incidence thereon of beams in paths 20 and 22, i.e., for a given wavelength, the plate will be thinner than would be the case if beams were normally incident thereon.

While the arrangement of attenuator 80 insures that each beam will experience the same level of polarization rotation, this result is achieved at the expense of unequal lengths for paths 20 and 22 and the above-discussed problems attendant thereon. The path difference can be reduced by increasing the separation of polarizing beamsplitter 12 and mirror 72, as a pair, from polarizing beam-combiner 30 and mirror 74 while reducing the angle of intersection of paths 20 and 22. This, of course can only be done by increasing the size of the attenuator.

Figure 7:
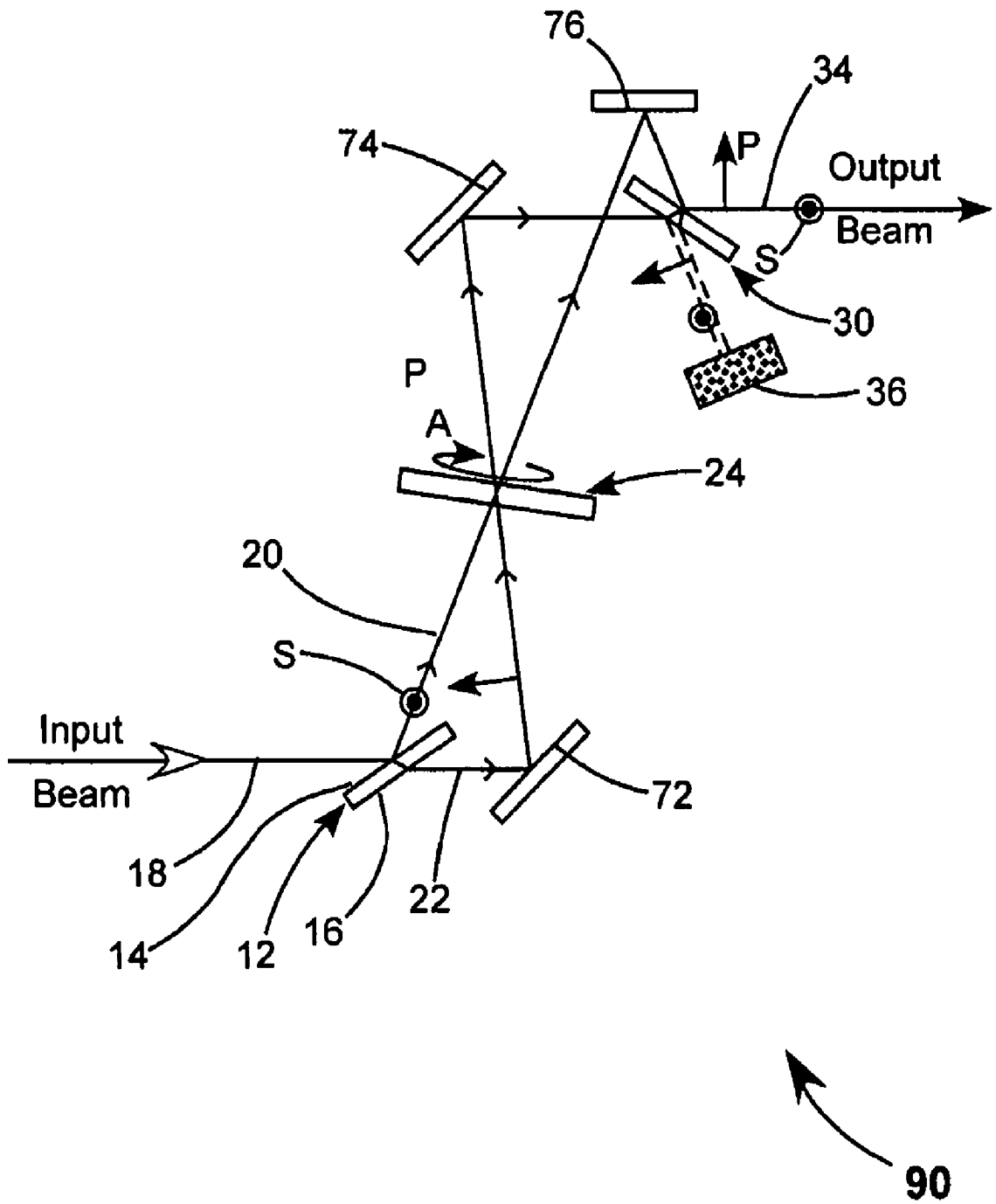
FIG. 7 schematically illustrates a further preferred embodiment of an attenuator in accordance with the present invention, similar to the embodiment of FIG. 6 including a third mirror and wherein the beam-combiner is differently oriented and the beamsplitter, beam-combiner and the three mirrors are arranged such that the two beam paths are equal in length.

FIG. 7 schematically illustrates a further embodiment 90 of an attenuator in accordance with the present invention wherein the advantages of both embodiments 70 and 80 can be enjoyed without a significant increase in size. Attenuator 90 is similar to attenuator 80 of FIG. 6 with an exception that and additional mirror 76 is included, and polarizing beam-combiner 30 is differently oriented with respect to polarizing beamsplitter 12 and mirror 74. Polarizing beamsplitter 12 directs path 20 to mirror 76, which, in turn, directs path 20 to polarizing beam-combiner 30. The orientation of polarizing beamsplitter is selected to combine paths 20 and 22 into common path 34 of the output beam. The spacing of the polarizing beamsplitter and the polarizing beam-combiner, and mirrors 72, 74, and 76 can be selected such that paths 20 and 22 are equal.

Another means of equalizing path lengths in the arrangement of FIG. 6 could be to include a fixed path extension (optical delay line) in path 20, created by three or more mirrors between the polarizing beamsplitter and the polarizing beam-combiner. An adjustable extension could be effected by two pairs of 45 mirrors with adjustable spacing between the pairs. From the detailed description present herein one skilled in the art may make these and other modifications of this or any other embodiment described herein without departing from the spirit and scope of the present invention.

In summary, the present invention is described above in terms of a preferred and other embodiments. The invention is not limited, however, to the embodiments described and depicted. Rather, the invention is limited only by the claims appended hereto.

What is claimed is:

1. Apparatus for attenuating a laser beam, comprising:
   first and second polarizing beamsplitters and at least two reflectors, each of said polarizing-beamsplitters arranged to transmit radiation plane-polarized in a first orientation and reflect radiation plane-polarized in a second orientation;
   said first and second polarizing beamsplitters and said at least two reflectors being arranged such that said first polarizing beamsplitter receives the beam to be attenuated and divides the beam into a first component transmitted along a first path to said second beamsplitter and a second component reflected along a second path to said second beamsplitter;
   said first and second beamsplitters and said at least two reflectors being further arranged such that the second beamsplitter receives both beam components and reflects a portion of each beam component and transmits a portion of each beam component; and
   a single common polarization rotator having an input surface and an output surface, said rotator being located both in said first and second beam paths between said first and second polarizing beamsplitters and arranged to selectively vary the polarization orientation of said first and second beam components so that the ratio of the amount of light transmitted by the second polarizing beam splitter with respect to the amount of light reflected by the second polarizing beam splitter can be adjusted and wherein at least a portion of said first path is at an angle to and intersects a portion of said second path and said rotator is located at about said intersection and wherein both the first and second beam paths enter the rotator through the input surface thereof and exit the rotator through the output surface thereof.

2. The apparatus of claim 1, wherein said first and second polarization orientations are perpendicular to each other.

3. The apparatus of claim 1, wherein said first and second polarizing beamsplitters are front-surface dielectric multilayer polarizing beamsplitters.

4. The apparatus of claim 1, wherein said polarization rotator is a half-wave plate.

5. The apparatus of claim 4, wherein said first and second paths are about equal in length.

6. Apparatus for attenuating a laser beam, comprising:
   first and second polarizing beamsplitters and at least two reflectors, each of said polarizing-beamsplitters arranged to transmit radiation plane-polarized in a first orientation and reflect radiation plane-polarized in a second orientation;
   said first and second polarizing beamsplitters and said at least two reflectors being arranged such that said first polarizing beamsplitter receives the beam to be attenuated and divides the beam into a first component transmitted along a first path to said second beamsplitter and a second component reflected along a second path to said second beamsplitter with said first and second paths being about equal in length;
   said first and second beamsplitters and said at least two reflectors being further arranged such that the second beamsplitter receives both beam components and reflects a portion of each beam component and transmits a portion of each beam component; and
   a single common polarization rotator having an input surface and an output surface, said rotator being located in both said first and second beam paths between said first and second polarizing beamsplitters and arranged to selectively vary the polarization orientation of said first and second beam components so that the ratio of the amount of light transmitted by the second polarizing beam splitter with respect to the amount of light reflected by the second polarizing beam splitter can be adjusted and wherein at least a portion of said first path is at an angle to and intersects a portion of said second path and said rotator is located at about said intersection and wherein both the first and second beam paths enter the rotator through the input surface thereof and exit the rotator through the output surface thereof.

7. A method for attenuating the power of an unpolarized light beam from an initial level to a lower target level comprising the steps of:

splitting the beam along first and second paths with the polarization state of the light in the first path being different from the polarization state in the second path;

using a polarizing beam combiner, combining via reflection a first portion of the light in each path and combining via transmission a second portion of the light in each path; and using a single common polarization rotator having an input surface and an output surface, said rotator being located to intersect with both paths, selectively rotating the polarization state of the light in each of the paths to control the ratio of the light transmitted by the combiner with respect to the light reflected by the combiner such that the power of one of the light transmitted or reflected by the beam combiner corresponds to said target level and will remain substantially at that target level even if the initial polarization state of the laser beam varies and wherein at least a portion of said first path is at an angle to and intersects a portion of said second path and said rotator is located at about said intersection and wherein both the first and second beam paths enter the rotator through the input surface thereof and exit the rotator through the output surface thereof.

8. The method of claim 7, wherein said polarization state of the first path is perpendicular to the polarization state in the second path.

9. The method of claim 7, wherein the polarizing beam combiner is a front-surface dielectric multilayer polarizing beamsplitter.

10. The method of claim 7, wherein said polarization rotator is a half-wave plate.

11. The method of claim 7, wherein said first and second paths are about equal in length.

* * * * *